Sept. 6, 1960 J. H. CROWDER 2,951,955
VIBRATION DAMPENERS FOR MACHINE TOOLS
Filed Dec. 24, 1954
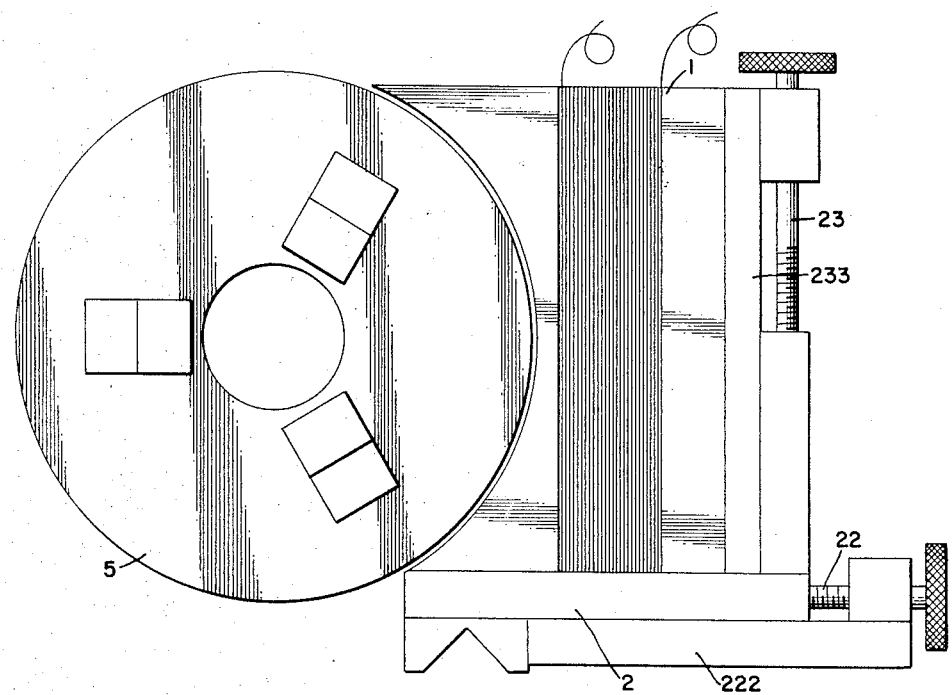
INVENTOR
John Hardin Crowder

United States Patent Office 2,951,955
Patented Sept. 6, 1960

2,951,955
VIBRATION DAMPENERS FOR MACHINE TOOLS
John Hardin Crowder, 1221 N. Trenton, Tulsa 6, Okla.
Filed Dec. 24, 1954, Ser. No. 477,574
1 Claim. (Cl. 310—93)

The purpose of my invention is to help improve the performance of machine tools by reducing that form of vibration known as "chatter" which often causes a rough finish on the work, making it difficult and sometimes impossible to achieve close tolerances. The form of it shown in this specification is primarily for use on lathes of various types but it can be adapted to other forms of tools handling machining operations.

"Chatter" can be caused by many things but the factor most often responsible is the edge of the cutting tool not having the right angle due to wear, injury, or sometimes to improper grinding. Other causes can be bad threads on the chuck plate, loose bearings, loose gibs in the cross slide and compound rest, wrong speed and sometimes improper leveling of the machine. I have also noticed that a thin spindle shows more tendency towards developing "chatter" than a thick one.

In my study of this type of vibration I have found that the frequency of it can be sometimes shown by the distance between tool marks on the work. When the cutting tool digs in it catches momentarily and as the work continues turning, releases. The vibration thus set up brings the work and tool closer together again causing it to dig and create more vibration which is amplified by resonance of the lathe parts resulting in "chatter." In my experiments vibration was always present during "chattering" and in some cases was so great that the tool post wrench dropped from the set screw.

In most cases the vibration travels along the spindle from the work in the chuck to the point upon which the driving pulley or gear is located. It is my opinion that a lathe with ball or roller bearings will have a tendency towards "chatter" more than one with plain ones, probably due to the fact that the plain bearings have more area of contact with the spindle and help dampen the vibration set up in it.

My invention for dampening vibration and reducing "chatter" consists of a concave electromagnet mounted on a strong adjustable support and placed at the back of the lathe behind the outer face covering the adapter plate of the chuck and back far enough to prevent the jaws from striking it. A close fit to the body of the chuck is necessary so that magnetic flux can easily reach it. The adjustable support is strong enough and has enough rigidity to prevent the magnet from coming into contact with the rotating surface.

A rheostat for varying the amount of current put into the electromagnet is placed in the circuit. It is best to use direct current in the operation as it has a better dampening effect than alternating current.

As I have before explained that in most cases of "chattering" the vibration travels from the work through the chuck to the spindle and on to the point at which the drive is located. The chuck is between the power and the resistance and is at an excellent point to dampen the vibration. A very accurate control over this dampening effect can be had through the use of the rheostat.

As there are some operations in which the dampener is not necessary, it will not have to be removed when not in use as it is out of the way in its position behind the chuck.

The drawing shows a preferred form of my damping device applied to a lathe chuck.

In order to better understand my invention please refer to the drawings in which the numeral 1 indicates the electromagnet, the adjustable support is shown by 2 with the screw 22 for moving it horizontally along the guides 222. The vertical screw 23 is shown for moving it in a vertical position along the guides 233. The lathe chuck is shown by 5.

It is possible to place the magnet in other positions, even having it near the work in some conditions, especially when there is production on cylindrical work of ferrous metals. The best position for most purposes however, is at the back of the lathe behind the chuck.

This dampener may also be used on a mill, or on a lathe that does not have a chuck, such as an automatic screw machine. A plate can be mounted on the arbor or spindle upon which the magnet can pull.

Many uses can be found for this type of vibration dampener and they can fall within the scope of my claim. My invention is practical, simple and easily constructed and having described it in detail what I now claim and desire to secure by Letters Patent is:

I claim:

A device for reducing objectionable harmonic vibration of lathe parts consisting of the following elements placed at a point between the work and the drive in operative combination; an adjustable electromagnet, having a concave pole surface and slidably mounted so that said pole surface is parallel to, concentric with, and spaced adjacent to the longitudinal periphery of a lathe chuck for magnetic cooperation therewith; the means of adjustment of said concave magnet being a horizontal and a vertical screw each attached to and actuating said magnet along rigid guides in their respective horizontal and vertical planes.

References Cited in the file of this patent

UNITED STATES PATENTS

| | | |
|---|---|---|
| 408,465 | Dewey | Aug. 6, 1889 |
| 469,800 | Wood | Mar. 1, 1892 |
| 624,142 | White | May 2, 1899 |
| 1,697,046 | Chapman | Jan. 1, 1929 |
| 2,130,903 | Rudenberg | Sept. 20, 1938 |
| 2,173,530 | Blazek | Sept. 19, 1939 |
| 2,351,424 | Hansen | June 13, 1944 |
| 2,520,582 | Tustin | Aug. 29, 1950 |
| 2,748,300 | Moberly | May 29, 1956 |
| 2,773,400 | Sulger | Dec. 11, 1956 |

FOREIGN PATENTS

| | | |
|---|---|---|
| 321,994 | Germany | June 15, 1920 |
| 829,389 | Germany | Jan. 24, 1952 |